United States Patent [19]

Sciamanda et al.

[11] Patent Number: 4,728,786
[45] Date of Patent: Mar. 1, 1988

[54] STEREO IMAGE INTENSIFIER

[75] Inventors: Robert J. Sciamanda; Joseph T. Sestak, both of Erie

[73] Assignee: American Sterilizer Company, Erie, Pa.

[21] Appl. No.: 798,769

[22] Filed: Nov. 15, 1985

[51] Int. Cl.⁴ .............................................. H01J 31/50
[52] U.S. Cl. ............................. 250/213 VT; 313/524
[58] Field of Search ................ 250/213 VT; 313/523, 313/524; 350/130, 131

[56] References Cited

U.S. PATENT DOCUMENTS

| | | | |
|---|---|---|---|
| 3,261,977 | 7/1966 | van der Velden | 350/130 |
| 3,781,560 | 12/1973 | DeBurgh et al. | 250/213 VT X |
| 3,787,688 | 1/1974 | Stone | 250/213 VT |
| 4,000,419 | 12/1976 | Crost et al. | 250/213 VT |
| 4,124,798 | 11/1978 | Thompson | 250/213 VT |
| 4,376,889 | 3/1983 | Swift | 250/213 VT |
| 4,463,252 | 7/1984 | Brennan et al. | 250/213 VT |

Primary Examiner—Eugene R. LaRoche
Assistant Examiner—David Mis
Attorney, Agent, or Firm—Kirkpatrick & Lockhart

[57] ABSTRACT

A stereo imaging apparatus using a single image intensifier is comprised of an input responsive to incident radiation corresponding to first and second views. An image intensifier is responsive to the input for simultaneously intensifying the incident radiation corresponding to the first and second views. An output is provided for the intensified radiation.

24 Claims, 5 Drawing Figures

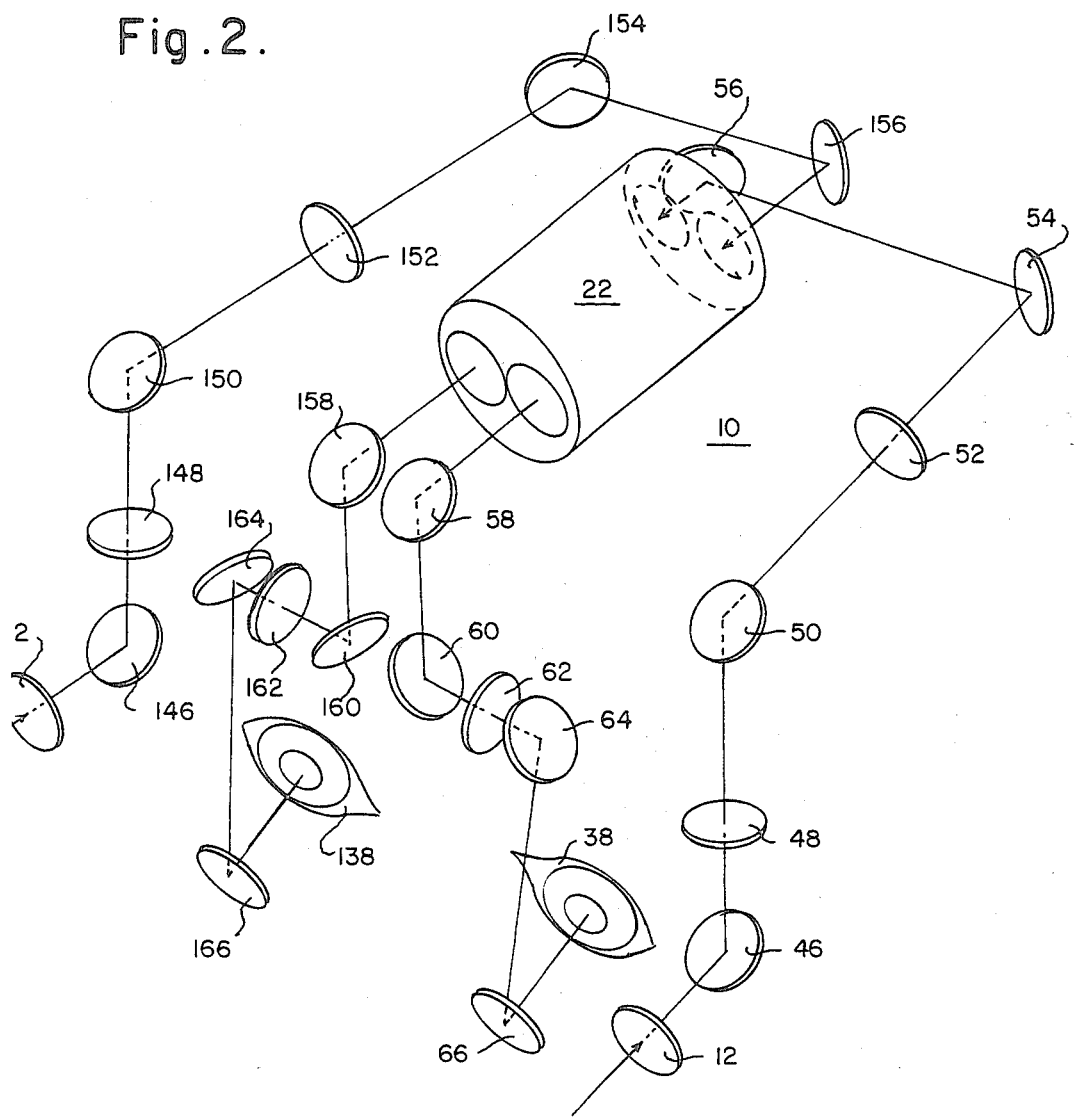

STEREO IMAGE INTENSIFIER

BACKGROUND OF THE INVENTION

Field of the Invention

The present invention relates to imaging apparatus and, more particularly, to stereo imaging apparatus.

Image intensifiers are used in a variety of applications. Night vision devices are used by the military to amplify or intensify available light to give the human eye the capability of viewing a scene which the unaided eye cannot see. Such night vision devices are also useful for surveillance by law enforcement officials. Image intensifiers have also found applications in underwater photography and in other areas where the amount of available light is insufficient for the desired purpose.

Various types of image intensifiers are commercially available. One type of image intensifier is available from Varo, Inc., Electron Devices Division. This image intensifier is comprised of a photocathode upon which low level light is directed. The photocathode converts the phosphor image into electrons. The electrons are accelerated toward a phosphor screen through a microchannel plate. As the electrons propagate through the microchannel plate, additional electrons are produced such that the image produced on the phosphor screen is of a higher intensity than the image focused upon the photocathode. Unfortunately, the images available on the phosphor screen are not stereo images. When stereo images are required, two image intensifiers are typically provided, one for the right channel and one for the left channel. Although an apparatus having two image intensifiers may be suitable in certain applications, the weight, bulk, and cost of such an apparatus clearly limit the applications where such an apparatus may be used.

A stereo imaging apparatus using a single image intensifier is disclosed in U.S. patent application Ser. No. 727,748 filed Apr. 26, 1985 and assigned to the same assignee as the present invention. Disclosed therein is an image intensifier having a color wheel. The color wheel is provided with flanges of different lengths which rotate with the color wheel to act, alternately and repetitively, as shutters for receiving and blocking radiaton from right and left channels. In this manner, the incident radiation is time multiplexed such that the image intensifier alternately amplifies the radiation corresponding to one channel and then the radiation corresponding to the other channel.

SUMMARY OF THE INVENTION

The present invention is directed to a stereo imaging apparatus using a single image intensifier. An input is responsive to incident radiation corresponding to first and second views. An image intensifier is responsive to the input for simultaneously intensifying the incident radiation corresponding to the first and second views. The intensified radiation corresponding to the first and second views is output.

The input and output of the present invention may assume any of a wide variety of forms. For example, the input may be comprised of an objective lens in combination with either groups of mirrors, bundles of optical fibers, or both. The output may take the form of an eyepiece used in combination with either groups of mirrors, bundles of optical fibers, or both. In this manner, radiation corresponding to right and left channels is input to and output from a single image intensifier.

According to another aspect of the present invention a stereo imaging apparatus using a single image intensifier to produce an intensified stereo image is disclosed. A first input is responsive to incident radiation corresponding to a first view. A second input is responsive to incident radiation corresponding to a second view. An image intensifier, simultaneously responsive to the first and second inputs, provides output radiation corresponding to the first and second views. The ouput radiation is of a higher intensity than the incident radiaton. A first ouput outputs the intensified radiation corresponding to the first view while a second ouput outputs the intensified radiation corresponding to the second view such that the first and second views provide an intensified stereo image.

The present invention is also directed to a method of producing an intensified stereo image which is comprised of the steps of inputting radiation corresponding to a first view to a first portion of an image intensifier. Radiation corresponding to a second view is input to a second portion of the image intensifier. The radiation corresponding to the first and second views is simultaneously intensified and then output.

Because the present invention provides a stereo image while substantially reducing the weight, bulk, and cost of the imaging apparatus, the imaging apparatus of the present invention may be used in new applications and may be configured according to the application. This represents a substantial advantage over other types of stereo imaging apparatus. In one embodiment, it is anticipated that the stereo imaging apparatus of the present invention may be configured to fit within a helmet or other type of headgear which may be comfortably worn and which frees the users hands. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments of the u present invention will now be described, by way of example only, with reference to the accompanying figures wherein:

FIG. 2 is an exploded schematic illustrating another embodiment of a stereo imaging apparatus constructed according to the teachings of the present invention;

DESCRIPTION OF A PREFERRED EMBODIMENT

Figure 1:
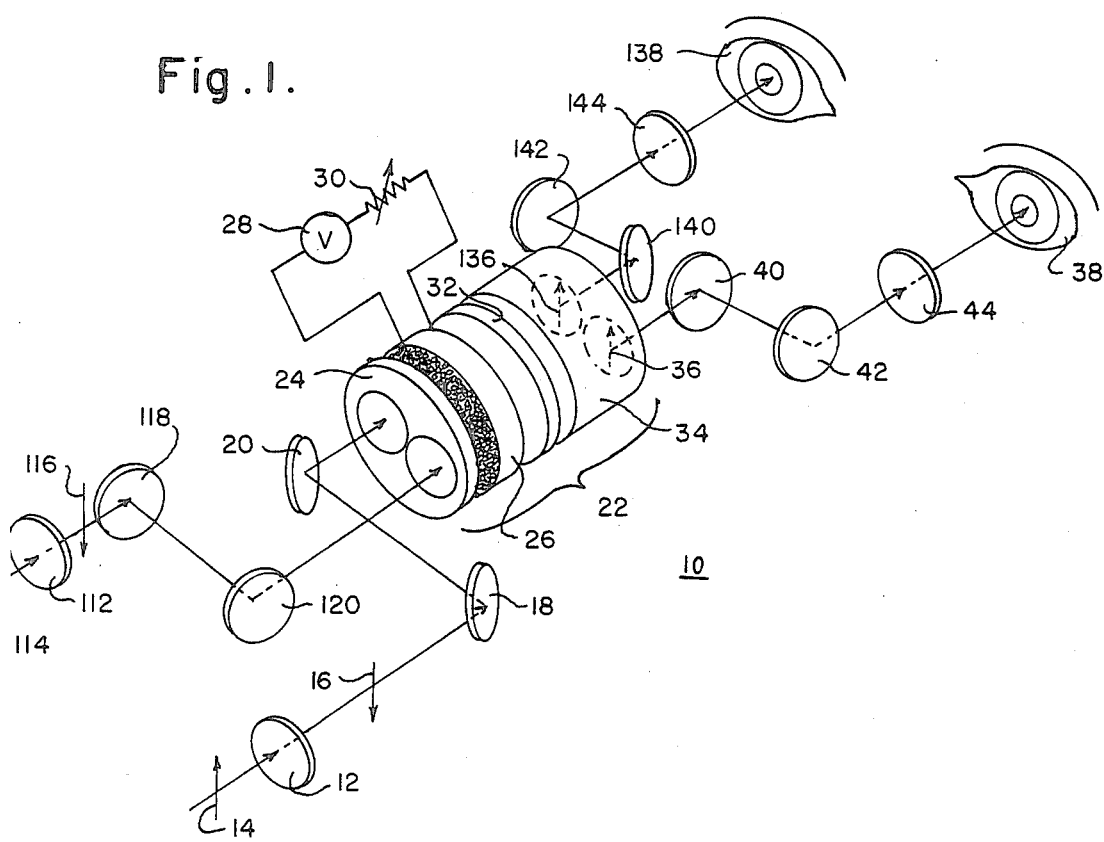
FIG. 1 is an exploded schematic illustrating a stereo imaging apparatus constructed according to the teachings of the present invention.

Illustrated in FIG. 1 is an exploded schematic of a stereo imaging apparatus 10 constructed according to the teachings of the present invention. The stereo imaging apparatus 10 illustrated in FIG. 1 is provided for purposes of illustration only. The present invention is not limited to the particular configuration of the stereo imaging apparatus 10 illustrated in FIG. 1.

In FIG. 1, the stereo imaging apparatus 10 has at its input end a first objective lens 12 responsive to incident radiation corresponding to an image 14 which is a first view of an object or scene. The objective lens 12 produces an inverted image 16 which is an inverted replica of the image 14. The radiation retaining the inverted image 16 is reflected by a mirror 18 and a mirror 20 to an image intensifier 22 which may take the form of a microchannel plate image intensifier (hereinafter mcp image intensifier 22). The objective lens 12 and mirrors 18 and 20 cooperate to spatially confine the incident radiation corresponding to the first view to a first predetermined portion of the mcp image intensifier 22.

The stereo imaging apparatus 10 additionally has at its input end a second objective lens 112 responsive to incident radiation corresponding to an image 114 which is a second view of the object or scene. The objective lens 112 produces an inverted image 116 which is an inverted replica of the image 114. The radiation retaining the inverted image 116 is reflected by a mirror 118 and a mirror 120 to the mcp image intensifier 22. The objective lens 112 and the mirrors 118 and 120 cooperate to spatially confine the incident radiation corresponding to the second view to a second predetermined portion of the mcp image intensifier 22. Those of ordinary skill in the art will recognize that input devices other than objective lenses 12 and 112 and mirrors 18, 118, 20, and 120, may be provided.

The mcp image intensifier 22 may be of the type constructed of a photocathode 24 which receives the images 16 and 116 and converts them into electrons. The electrons produced by the photocathode 24 enter a microchannel plate 26. Mcp image intensifiers 22 are currently commercially available which have microchannel diameters on the order of from ten to twenty-five microns. As the electrons propagate through the microchannels, additional electrons are generated. The electrons may be accelerated by a voltage source 28, which is adjustable via adjustable resistor 30, into a phosphor screen 32. Because of the additional electrons provided by the microchannel plate 26, the images produced on the phosphor screen 32 are of a higher intensity than either the images 16 and 116 or the images 14 and 114. The intensified images are conducted through a device commonly referred to as a twister 34 which provides intensified inverted images 36 and 136. The intensified inverted images 36 and 136 correspond to the images 14 and 114, respectively, but are of a greater intensity. Because of the twister 34, the radiation corresponding to the first view, i.e. the left channel, is input to the right side (with respect to the user) of the mcp image intensifier 22 and the radiation corresponding to the second view, i.e. the right channel, is input to the left side (with respect to the user) of the mcp image intensifier 22.

The mcp image intensifier 22 may be a commerically available unit such as a model 5700 available from Varo, Inc., Electron Devices Division, located at 2203 West Walnut Street, P. 0. Box 469014, Garland, Tex. It is anticipated that other types of mcp image intensifiers 22, which may or may not include the twister 34, may be used in combination with the present invention.

The radiation containing the intensified inverted image 36 is input to the users left eye 38 through the series combination of a mirror 40, a mirror 42, and a first eyepiece 44. The radiation containing the intensified inverted image 136 is input to the users right eye 138 through the series combination of a mirror 140, a mirror 142, and a second eyepiece 144. The intensified inverted images 36 and 136 cooperate to provide an intensified stereo image of the object or scene. In this manner, a stereo image is provided by a stereo imaging apparatus 10 using a single image intensifier 22. Those of ordinary skill in the art will recognize that the present invention is not limited to the mirrors 40, 140, 42, and 142 and first and second eyepieces 44 and 144, respectively. Rather, any number of mirrors, lens, eyepieces, optical fibers, etc. may be used as described hereinbelow in conjunction with FIGS. 2, 4, and 5.

The stereo imaging apparatus 10 illustrated in FIG. 1 may be used in an application in which the imaging apparatus is held, or positioned, in front of the user. However, it is anticipated that the mcp image intensifier 22 may be positioned in any convenient location and provided with appropriate input and ouput devices. Such an alternative embodiment is illustrated in FIG. 2.

In FIG. 2 another embodiment of a stereo imaging apparatus 10 constructed according to the teachings of the present invention is illustrated. In the embodiment shown in FIG. 2, it is anticipated that the mcp image intensifier 22 will be positioned above, or behind the user. In FIG. 2, components performing the same function as those illustrated in FIG. 1 are provided with the same reference numeral.

In FIG. 2 the objective lens 12 is responsive to radiation corresponding to the first view, i.e. the left channel, of the object or scene. The radiation corresponding to the first view is input to the right side (with respect to the user) of the mcp image intensifier 22 through the series combination of a mirror 46, a lens 48, a mirror 50, a lens 52, and mirrors 54 and 56. Those of ordinary skill in the art will recognize that mirrors 46, 50, 54, and 56 and lenses 48 and 52 are provided such that the radiation may be properly conveyed to the mcp image intensfier 22. The exact positioning of the mirrors 46, 50, 54, and 56 and the type of lenses 48 and 52 are determined by the length and shape of the path between the objective lens 12 and the mcp image intensifier 22. The proper positioning of the mirrors 46, 50, 54, and 56 as well as the proper selection of the lenses 48 and 52 is accomplished according to well-known principles of optics and are well within the skill of one of ordinary skill in the art.

The intensified image corresponding to the first view is input to the users left eye 38 through the series combination of a mirror 58, a mirror 60, a lens 62, a mirror 64, and a mirror 66. The positioning of the mirrors 58, 60, 64, and 66 as well as the selection of the lens 62 are determined by the length and configuration of the path from the mcp image intensifier 22 to the users left eye 38. The proper positioning of the mirrors 58, 60, 64, and 66 as well as the proper selection of the lens 62 are accomplished according to well-known principles of optics and are well within the skill of one of ordinary skill in the art.

A similar channel, i.e. the right channel, is provided for conveying the radiation corresponding to the second view from the objective lens 112 to the mcp image intensifier 22, and from the mcp image intensifier 22 to the user's right eye 138.

Figure 3:
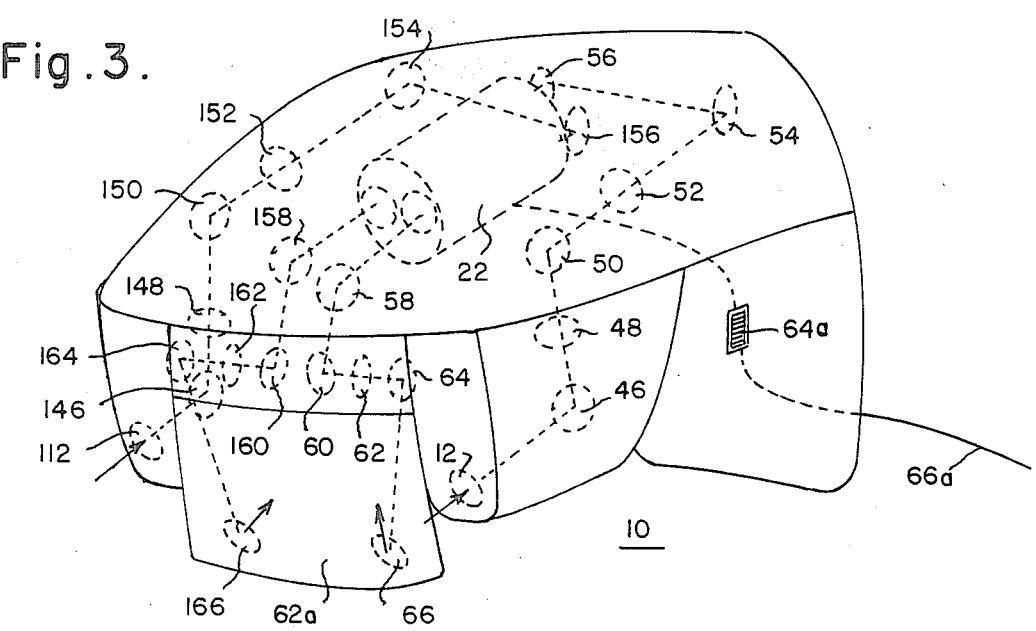
FIG. 3 illustrates a helmet carrying the stereo imaging apparatus illustrated in FIG. 2.

In FIG. 3 the stereo imaging apparatus 10 illustrated in FIG. 2 is carried by a helmet 60. The helmet 60 carries objective lenses 12 and 112 such that the lenses receive a portion of substantially the same incident radiation as the user's eyes 38 and 138, respectively. The intensified images produced by the mcp image intensifier 22 are available at the mirrors 66 and 166 which are carried by a transparent visor 62a which is a part of the helmet 60. The mcp image intensfier 22 is responsive to a thumb-wheel adjustment 64a and a supply voltage (not shown) connected through a conductor 66a.

By providing the helmet 60 incorporating the stereo imaging apparatus 10 as shown in FIG. 3, a surgeon, or other individual wearing the helmet 60, is provided with a clear field of vision through the transparent visor 62a. Should the surgeon or other individual require an intensified image, he need only divert his eyes to the mirrors 66 and 166 where the intensified stereo image is available. Operation of the thumb-wheel 64a increases or decreases the intensity of the intensified image. By providing the power supply in another location, the overall helmet 60 may be made lightweight and therefore more comfortable for the wearer. Additionally, the users hands are free to perform whatever tasks are necessary. In this manner, the individual has available to him both the original image and a stereo intensified image produced by a compact and lighweight apparatus. Such an apparatus represents a substantial advantage over the art.

Figure 4:
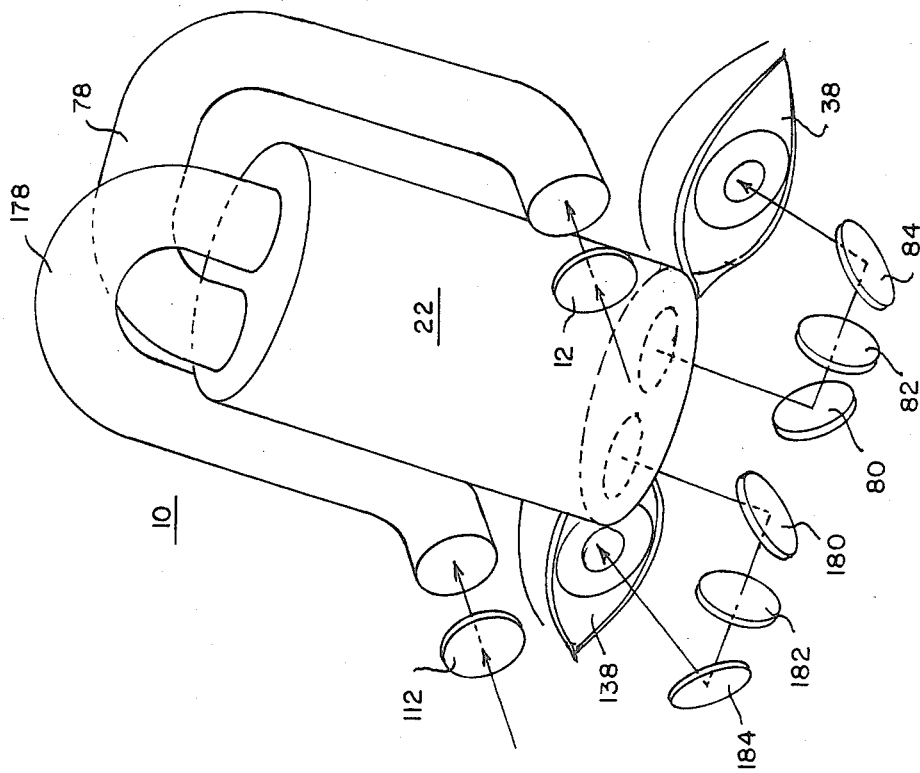
FIGS. 4 and 5 are exploded schematics illustrating two other embodiments of stereo imaging apparatus constructed according to the teachings of the present invention.

Another embodiment of a stereo imaging apparatus 10 constructed according to the teachings of the present invention is illustrated in FIG. 4. In FIG. 4, the objective lens 12 is responsive to radiation corresponding to a first view. That radiation is input to the mcp image intensifier 22 through mirrors 68, 70, and 72 arranged as shown in FIG. 4. The intensified radiation corresponding to the first view is input to the users left eye 38 through a first bundle of optical fibers 74 and a first eyepiece 76. A similar channel is provided for the radiation corresponding to the second view by objective lens 112, mirrors 168, 170, and 172, mcp image intensifier 22, a second bundle of optical fibers 174, and an eyepiece 176. It is anticipated that the imaging apparatus 10 illustrated in FIG. 4 may also be carried by a helmet or other headgear.

Figure 5:
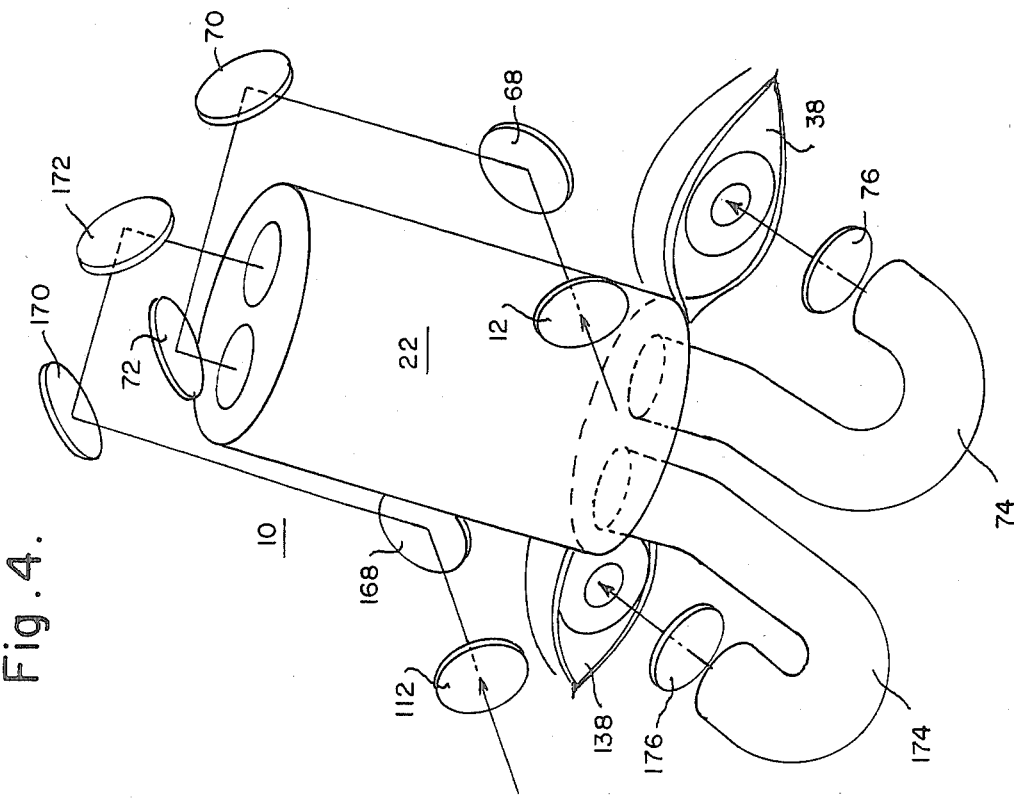

Another embodiment of a stereo imaging apparatus 10 constructed according to the teachings of the present invention is illustrated in FIG. 5. In FIG. 5, incident radiation corresponding to a first view is input to mcp image intensifier 22 through the first objective lens 12 and a first bundle of optical fibers 78. The intensified radiation corresponding to the first view is input to the users left eye 38 through the series combination of a mirror 80, lens 82, and a mirror 84. A similar path is provided for the incident radiation corresponding to the second view through the objective lens 112, second bundle of optical fibers 178, mcp image intensifier 22, a mirror 180, a lens 182, and a mirror 184. It is anticipated that the stereo imaging apparatus 10 illustrated in FIG. 5 may be carried by a helmet or other headgear. It should be apparent to those of ordinary skill in the art that numerous configurations of input and output devices used in combination with an image intensifier positioned in any convenient location may be designed.

In summary, the present invention presents an apparatus and method for providing a stereo image using a single image intensfier. The apparatus of the present invention is extremely small and lightweight thereby opening up new applications for such a device. While the present invention has been described in connection with exemplary embodiments thereof, it is understood that many modifications and variations will be readily apparent to those of ordinary skill in the art. This disclosure and the following claims are intended to cover such modifications and variations.

What is claimed is:

1. A stereo imaging apparatus using a single image intensifier, comprising:
   input means responsive to incident radiation corresponding to first and second views of the same object;
   an image intensifier responsive to said input means for simultaneously intensifying the incident radiation corresponding to the first and second views; and
   means for outputting said intensified radiation.

2. The apparatus of claim 1 wherein said input means includes two objective lenses, one being responsive to the first view and one being responsive to the second view.

3. The apparatus of claim 2 wherein said input means includes a plurality of mirrors responsive to said object lens for inputting the incident radiation to said image intensifier.

4. The apparatus of claim 2 wherein said input means includes bundles of optical fibers responsive to said objective lens for inputting the incident radiation to said image intensifier.

5. The apparatus of claim 2 wherein said output means includes two eyepieces, one being responsive to the intensified radiation corresponding to the first view and one being responsive to the intensified radiation corresponding to the second view.

6. The apparatus of claim 5 wherein said output means includes a plurality of mirrors for conducting said intensified radiation to said eyepieces.

7. The apparatus of claim 5 wherein said output means includes bundles of optical fibers for conducting said intensified radiation to said eyepieces.

8. The apparatus of claim 1 wherein said image intensifier includes a microchannel plate image intensifier having an input photocathode.

9. The apparatus of claim 8 wherein said input means conducts the incident radiation corresponding to the first view to a first predetermined portion of said input photocathode and conducts the incident radiation corresponding to the second view to a second predetermined portion of said input photocathode.

10. The apparatus of claim 1 wherein said input means has a first portion responsive to the incident radiation corresponding to the first view and configured such that the first view includes substantially the same incident radiation as received by a user's left eye, and a second portion responsive to the incident radiation corresponding to the second view and configured such that the second view includes substantially the same incident radiation as received by the user's right eye.

11. The apparatus of claim 10 wherein said output means is configured to provide said intensified radiation to the user's right and left eyes.

12. The apparatus of claim 11 wherein said input and output means are additionally configured such that said image intensifier is positioned in front of the user.

13. The apparatus of claim 11 wherein said input and output means are additionally configured such that said image intensifier is positioned in back of the user.

14. The apparatus of claim 11 wherein said input and output means are additionally configured such that said image intensifier is position above the user.

15. The apparatus of claim 14 wherein said apparatus is configured to be worn on the user's head.

16. A stereo imaging apparatus using a single image intensifier to produce an intensified stereo image, comprising:

first input means responsive to incident radiation corresponding to a first view of an object;

second input means responsive to incident radiation corresponding to a second view of the same object;

an image intensifier simultaneously responsive to said first and second input means for providing output radiation corresponding to the first and second views, said output radiation being of a higher intensity than the incident radiation;

first means for outputting the intensified radiation corresponding to the first view; and second means for outputting the intensified radiation corresponding to the second view such that said first and second views provide an intensified stereo image.

17. The apparatus of claim 16 wherein said first input means includes a first objective lens responsive to the incident radiation corresponding to the first view and a first plurality of mirrors responsive to said first objective lens for inputting the incident radiation corresponding to the first view to said image intensifier, and wherein said second input means includes a second objective lens responsive to the incident radiation corresponding to the second view and a second plurality of mirrors responsive to said second objective lens for inputting the incident radiation corresponding to the second view to said image intensifier.

18. The apparatus of claim 16 wherein said first input means includes a first objective lens responsive to the incident radiation corresponding to the first view and a first bundle of optical fibers responsive to said objective lens for inputting the incident radiation corresponding to the first view to said image intensifier, and wherein said second input means includes a second objective lens responsive to the incident radiation corresponding to the second view and a second bundle of optical fibers responsive to said second objective lens for inputting the incident radiation corresponding to the second view to said image intensifier.

19. The apparatus of claim 16 wherein said first means for outputting includes a first eyepiece and a first plurality of mirrors for conducting the intensified radiation corresponding to the first view to said first eyepiece, and wherein said second means for outputting includes a second eyepiece and a second plurality of mirrors for conducting the intensified radiation corresponding to the second view to said second eyepiece.

20. The apparatus of claim 16 wherein said first means for outputting includes a first eyepiece and a first bundle of optical fibers for conducting said intensified radiation corresponding to the first view to said first eyepiece, and wherein said second means for outputting includes a second eyepiece and a second bundle of optical fibers for conducting said intensified radiation corresponding to the second view to said second eyepiece.

21. The apparatus of claim 16 wherein said image intensifier includes a microchannel plate image intensifier having an input photocathode, and wherein said first input means conducts the incident radiation corresponding to the first view to a first predetermined portion of said input photocathode and wherein said second input means conducts the incident radiation corresponding to the second view to a second predetermined portion of said input photocathode.

22. The apparatus of claim 16 wherein said first input means is configured such that the incident radiation corresponding to the first view includes substantially the same incident radiation as received by a user's left eye, and wherein said second input means is configured such that the incident radiation corresponding to the second view includes substantially the same incident radiation as received by the user's right eye.

23. The apparatus of claim 22 wherein said apparatus is configured to be worn on the user's head.

24. A method of producing an intensified stereo image, comprising the steps of:

inputting radiation corresponding to a first view of an object to a first portion of an image intensifier;

inputting radiation corresponding to a second view of the same object to a second portion of the image intensifier;

simultaneously intensifying the radiation corresponding to the first and second views;

and outputting the intensified radiation.

* * * * *

UNITED STATES PATENT AND TRADEMARK OFFICE
CERTIFICATE OF CORRECTION

PATENT NO. : 4,728,786

DATED : March 1, 1988

INVENTOR(S) : Robert J. Sciamanda and Joseph T. Sestak

It is certified that error appears in the above-identified patent and that said Letters Patent is hereby corrected as shown below:

Col. 2, line 10, delete "radiaton" and substitute therefor --radiation--.

Col. 2, line 11, delete "ouput" and substitute therefor --output--.

Col. 2, line 12, delete "ouput" and substitute therefor --output--.

Col. 5, line 19, delete "lighweight" and substitute therefor --lightweight--.

Signed and Sealed this

Eighth Day of November, 1988

Attest:

DONALD J. QUIGG

*Attesting Officer*  *Commissioner of Patents and Trademarks*